(12) United States Patent
Greenham et al.

(10) Patent No.: US 10,500,571 B2
(45) Date of Patent: Dec. 10, 2019

(54) ASC WITH PLATINUM GROUP METAL IN MULTIPLE LAYERS

(71) Applicant: JOHNSON MATTHEY PUBLIC LIMITED COMPANY, London (GB)

(72) Inventors: Neil Greenham, Royston (GB); Jing Lu, Wayne, PA (US); Andrew Newman, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/938,202

(22) Filed: Mar. 28, 2018

(65) Prior Publication Data

US 2018/0280945 A1   Oct. 4, 2018

Related U.S. Application Data

(60) Provisional application No. 62/478,147, filed on Mar. 29, 2017.

(51) Int. Cl.

| | |
|---|---|
| *B01J 29/76* | (2006.01) |
| *B01J 23/42* | (2006.01) |
| *B01J 23/40* | (2006.01) |
| *B01J 29/40* | (2006.01) |
| *B01J 35/00* | (2006.01) |
| *B01J 37/02* | (2006.01) |
| *B01J 37/08* | (2006.01) |
| *B01D 53/94* | (2006.01) |
| *F01N 3/20* | (2006.01) |
| *F01N 3/28* | (2006.01) |
| *F01N 13/00* | (2010.01) |
| *B01J 29/44* | (2006.01) |
| *B01J 29/72* | (2006.01) |
| *B01J 35/04* | (2006.01) |

(52) U.S. Cl.
CPC .......... *B01J 29/76* (2013.01); *B01D 53/9418* (2013.01); *B01D 53/9436* (2013.01); *B01D 53/9468* (2013.01); *B01D 53/9472* (2013.01); *B01J 23/42* (2013.01); *B01J 29/40* (2013.01); *B01J 29/44* (2013.01); *B01J 29/72* (2013.01); *B01J 29/723* (2013.01); *B01J 35/0006* (2013.01); *B01J 35/04* (2013.01); *B01J 37/0215* (2013.01); *B01J 37/0236* (2013.01); *B01J 37/0244* (2013.01); *B01J 37/0246* (2013.01); *B01J 37/0248* (2013.01); *B01J 37/08* (2013.01); *F01N 3/2066* (2013.01); *F01N 3/28* (2013.01); *F01N 13/0097* (2014.06); *B01D 2255/1021* (2013.01); *B01D 2255/20738* (2013.01); *B01D 2255/20761* (2013.01); *B01D 2255/50* (2013.01); *B01D 2255/9022* (2013.01); *B01D 2255/9032* (2013.01); *B01D 2255/9035* (2013.01); *F01N 2510/063* (2013.01); *F01N 2570/14* (2013.01); *F01N 2570/18* (2013.01)

(58) Field of Classification Search
CPC ............ B01D 53/9418; B01D 53/9422; B01D 53/9436; B01D 53/9459; B01D 53/9468; B01D 53/9472; B01D 2255/102; B01D 2255/207; B01D 2255/902; B01D 2255/9022; B01D 2257/9022; B01D 2257/404; B01D 2257/406; B01D 2258/01; B01D 2258/012; B01J 23/40; B01J 23/70; F01N 3/101; F01N 3/2066; F01N 2370/04; F01N 2570/14; F01N 2570/18

See application file for complete search history.

(56) References Cited

U.S. PATENT DOCUMENTS

| | | | | |
|---|---|---|---|---|
| 6,133,185 | A * | 10/2000 | Kinugasa ........... | B01D 53/9418 502/67 |
| 7,722,845 | B2 * | 5/2010 | Caudle ..................... | B01J 23/42 423/239.1 |
| 7,767,176 | B2 * | 8/2010 | Patchett ............. | B01D 53/9418 423/213.5 |
| 10,105,692 | B2 * | 10/2018 | Andersen ........... | B01D 53/8628 |
| 2009/0126353 | A1 * | 5/2009 | Han ................... | B01D 53/9436 60/297 |
| 2010/0058746 | A1 * | 3/2010 | Pfeifer ............... | B01D 53/9468 60/297 |
| 2014/0044630 | A1 * | 2/2014 | Swallow ............ | B01D 53/9418 423/213.5 |
| 2014/0171292 | A1 * | 6/2014 | Kunieda .............. | B01J 29/7215 502/66 |
| 2014/0349840 | A1 * | 11/2014 | Han ................... | B01D 53/9436 502/74 |
| 2016/0001228 | A1 | 1/2016 | Chang et al. | |
| 2016/0367937 | A1 | 12/2016 | Lu et al. | |
| 2016/0367973 | A1 | 12/2016 | Larsson et al. | |

FOREIGN PATENT DOCUMENTS

| | | | | |
|---|---|---|---|---|
| CN | 107949436 A | * | 4/2018 | .......... B01J 37/0244 |
| GB | 2542231 A | | 8/2016 | |
| GB | 2018 05137 | * | 5/2018 | .............. B01J 21/08 |
| GB | 2 563 968 A | * | 1/2019 | .............. B01J 21/08 |

\* cited by examiner

*Primary Examiner* — Timothy C Vanoy

(57) ABSTRACT

A catalytic article for treating an exhaust gas stream containing particulate matter, hydrocarbons, CO, and ammonia, the article may include: (a) a substrate having an inlet end and an outlet end defining an axial length; (b) a first catalyst coating including: 1) a platinum group metal distributed on a molecular sieve, and 2) a base metal distributed on a molecular sieve; and (c) a second catalyst coating including: 1) a platinum group metal distributed on a molecular sieve, and 2) a base metal distributed on a molecular sieve.

33 Claims, 9 Drawing Sheets

Figure 1
Figure 1a
Figure 1b

*Where PGM loading in top layer is less than lower layer

*Where PGM loading in top layer is same as lower layer

Figure 4
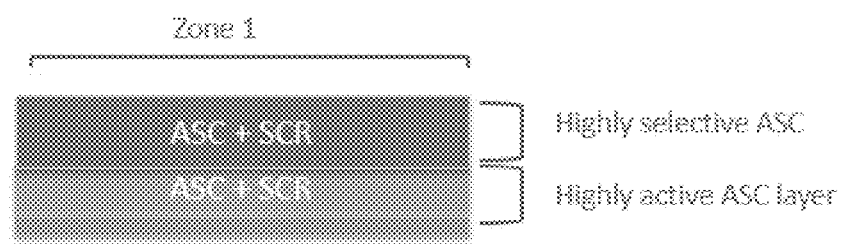
*Where PGM loading in top layer is less than lower layer
Figure 4a
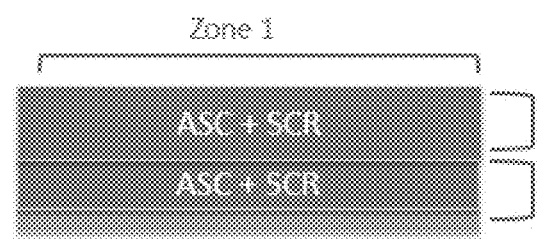
*Where PGM loading in top layer is same as lower layer
Figure 4b Figure 5
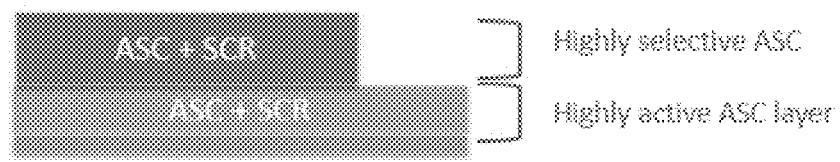
*Where PGM loading in top layer is less than lower layer
Figure 5a
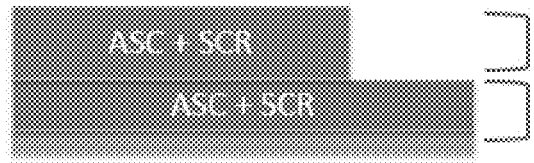
*Where PGM loading in top layer is same as lower layer
Figure 5b Figure 6
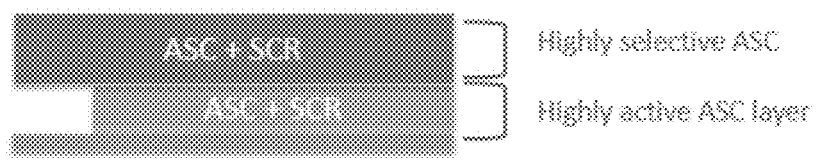
*Where PGM loading in top layer is less than lower layer
Figure 6a
*Where PGM loading in top layer is same as lower layer
Figure 6b Figure 7
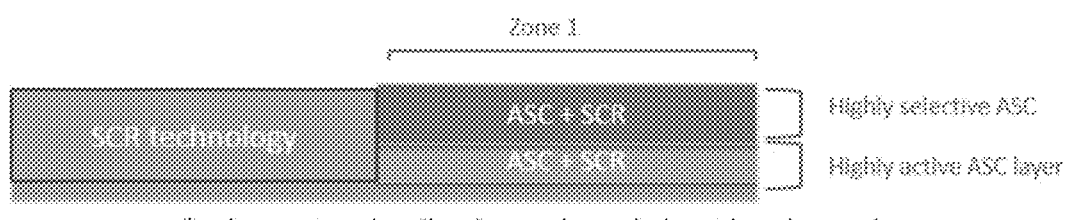
*Where PGM loading in top layer is less than lower layer
Figure 7a
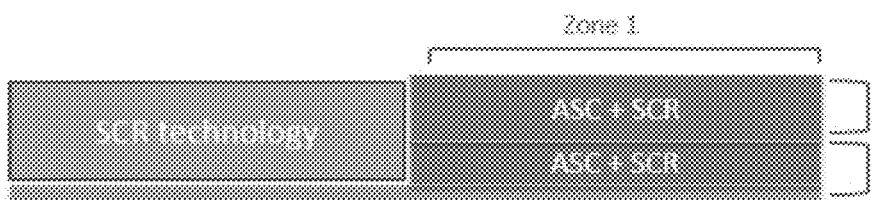
*Where PGM loading in top layer is same as lower layer
Figure 7b Figure 8
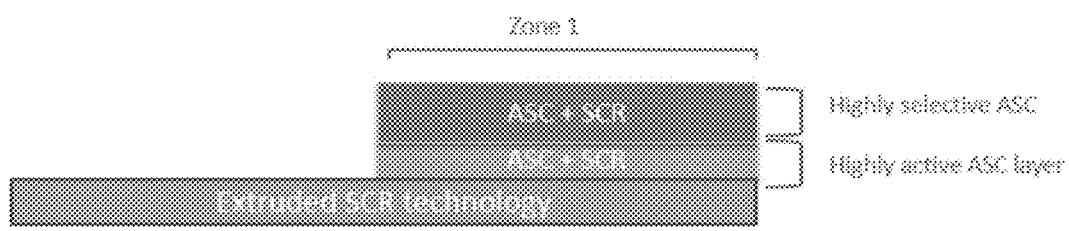
*Where PGM loading in top layer is less than lower layer
Figure 8a
*Where PGM loading in top layer is same as lower layer
Figure 8b

ASC WITH PLATINUM GROUP METAL IN MULTIPLE LAYERS

CROSS-REFERENCE TO RELATED APPLICATIONS

This application claims priority to U.S. Provisional Patent Application No. 62/478,147, filed on Mar. 29, 2017, and is incorporated herein by reference.

BACKGROUND OF THE INVENTION

Hydrocarbon combustion in diesel engines, stationary gas turbines, and other systems generates exhaust gas that must be treated to remove nitrogen oxides (NOx), which comprises NO (nitric oxide) and $NO_2$ (nitrogen dioxide), with NO being the majority of the NOx formed. NOx is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Exhaust gas generated in lean-burn and diesel engines is generally oxidative. NOx needs to be reduced selectively with a catalyst and a reductant in a process known as selective catalytic reduction (SCR) that converts NOx into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalyzed substrate. In order to maximize the conversion of NOx, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore the release of ammonia in exhaust gas should be eliminated. In many conventional exhaust systems, an ammonia oxidation catalyst (also known as an ammonia slip catalyst or "ASC") is installed downstream of the SCR catalyst to remove ammonia from the exhaust gas by converting it to nitrogen. The use of ammonia slip catalysts can allow for $NO_x$ conversions of greater than 90% over a typical diesel driving cycle.

It would be desirable to have a catalyst that provides for both NOx removal by SCR and for selective ammonia conversion to nitrogen, where ammonia conversion occurs over a wide range of temperatures in a vehicle's driving cycle, and minimal nitrogen oxide and nitrous oxide by-products are formed.

SUMMARY OF THE INVENTION

According to some embodiments of the present invention, a catalytic article for treating an exhaust gas stream containing particulate matter, hydrocarbons, CO, and ammonia, includes: (a) a substrate having an inlet end and an outlet end defining an axial length; (b) a first catalyst coating including: 1) a platinum group metal distributed on a molecular sieve, and 2) a base metal distributed on a molecular sieve; and (c) a second catalyst coating including: 1) a platinum group metal distributed on a molecular sieve, and 2) a base metal distributed on a molecular sieve.

In some embodiments, the first catalyst coating extends from the outlet end toward the inlet end, covering less than the entire axial length of the substrate; and the second catalyst coating extends from the inlet end toward the outlet end, covering less than the entire axial length of the substrate and overlapping a portion of the first catalyst coating.

In some embodiments, the first catalyst coating extends from the outlet end toward the inlet end, covering less than the entire axial length of the substrate; and the second catalyst coating covers the entire axial length of the substrate and overlaps the first catalyst coating.

In some embodiments, the first catalyst coating covers the entire axial length of the substrate; and the second catalyst coating extends from the inlet end toward the outlet end, covering less than the entire axial length of the substrate and overlapping a portion of the first catalyst coating.

In some embodiments, the first catalyst coating covers the entire axial length of the substrate; and the second catalyst coating covers the entire axial length of the substrate and overlaps the first catalyst coating.

In some embodiments, the platinum group metal in the first and/or second coating comprises platinum, palladium, or a combination thereof. The molecular sieve in the first and/or second coating may include a zeolite. The base metal in the first and/or second coating may include, for example, copper, iron, or a combination thereof.

In some embodiments, the first coating and second coating each comprise platinum distributed on a zeolite and copper distributed on a zeolite. In some embodiments, the first coating includes a higher platinum group metal loading than the second coating. In some embodiments, the first coating and the second coating include an equivalent platinum group metal loading. In some embodiments, the first coating may include a platinum group metal loading of about 0 $g/ft^3$ to about 10 $g/ft^3$; or about 1 $g/ft^3$ to about 5 $g/ft^3$. In some embodiments, the second coating may include a platinum group metal of about 0 $g/ft^3$ to about 5 $g/ft^3$; or about 1 $g/ft^3$ to about 3 $g/ft^3$. In some embodiments, the weight ratio of platinum group metal in the first coating to the platinum group metal in the second coating is from about 20:1 to about 1:3; about 20:1 to about 1:1; about 10:1 to about 1:2; about 10:1 to about 1:1; about 6:1 to about 1:1; about 3:1 to about 1:1; or about 3:0.5 to about 1:1.

In some embodiments, the first catalyst coating and the second catalyst coating overlap to form three zones, a first zone to primarily remove NOx, a second zone to primarily oxidize ammonia to $N_2$, and a third zone to primarily oxidize carbon monoxide and hydrocarbons.

In some embodiments, the substrate comprises an extruded SCR. In some embodiments, the first coating and the second coating are located on an outlet end of the substrate.

An emissions treatment system may include a diesel engine emitting an exhaust stream including particulate matter, NOx, and carbon monoxide; and a catalytic article as described herein ("the ASC"). In some embodiments, the system may include an SCR catalyst upstream of the ASC. In some embodiments, the SCR catalyst is close-coupled with the ASC. In some embodiments, the SCR catalyst and the ASC catalyst are located on a single substrate, and the SCR catalyst is located on an inlet side of the substrate and the ASC catalyst is located on the outlet side of the substrate.

A method of reducing emissions from an exhaust stream may include contacting the exhaust stream with the catalyst article as described herein.

BRIEF DESCRIPTION OF THE DRAWINGS

FIG. 1 depicts catalyst configurations of the prior art, with an ASC and SCR catalyst in the bottom layer and an SCR catalyst in the top layer.

FIG. 4 depicts catalyst configurations having an ASC and SCR catalyst in the bottom layer and an ASC and SCR catalyst in the top layer, where the bottom layer and the top layer each extend the entire length of the substrate.

FIG. 5 depicts catalyst configurations having an ASC and SCR catalyst in the bottom layer and an ASC and SCR catalyst in the top layer, where the bottom layer extends the length of the substrate and the top layer extends from the inlet end toward the outlet end, covering less than the entire length of the substrate.

FIG. 6 depicts catalyst configurations having an ASC and SCR catalyst in the bottom layer and an ASC and SCR catalyst in the top layer, wherein the bottom layer extends from the outlet end toward the inlet end, covering less than the length of the substrate, and the top layer extends the length of the substrate.

FIG. 7 depicts catalyst configurations having an ASC and SCR catalyst in the bottom layer and an ASC and SCR catalyst in the top layer, located downstream from an SCR catalyst.

FIG. 8 depicts catalyst configurations having an ASC and SCR catalyst in the bottom layer and an ASC and SCR catalyst in the top layer, located on an extruded SCR catalyst.

DETAILED DESCRIPTION OF THE INVENTION

Figure 2:
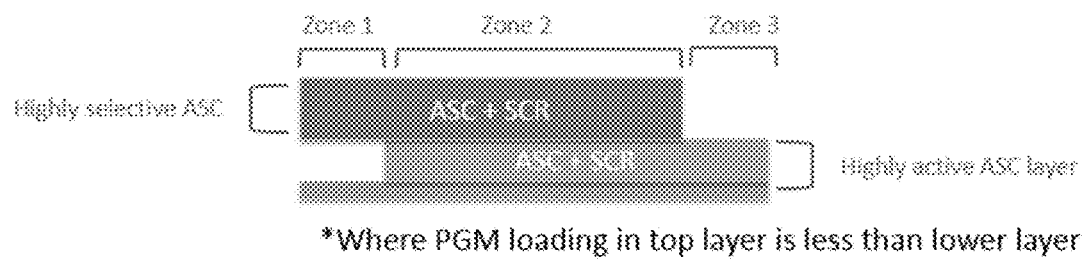
FIG. 2 depicts catalyst configurations having an ASC and SCR catalyst in the bottom layer and an ASC and SCR catalyst in the top layer, where the bottom layer extends from the outlet end toward the inlet end, covering less than the entire length of the substrate and the top layer extends from the inlet end toward the outlet end, covering less than the entire length of the substrate.

Catalysts of the present invention relate to catalyst articles having SCR and ASC functionality. The catalyst article may have a first catalyst coating including 1) a platinum group metal distributed on a molecular sieve, and 2) a base metal distributed on a molecular sieve; and a second catalyst coating including: 1) a platinum group metal distributed on a molecular sieve, and 2) a base metal distributed on a molecular sieve. Traditionally, such catalyst articles have included SCR functionality in the top or front layer, and ASC functionality in a bottom or rear layer. It has surprisingly been found that including a platinum group metal on a molecular sieve in both a top and bottom layer provides various benefits and advantages to $NH_3$ conversion, as well as zoned ASC configurations with desirable selectivity and catalyst activity.

Catalytic articles of the present invention may have various configurations on a substrate having an axial length. In some embodiments, the catalytic article has a first catalyst coating extending from the outlet end toward the inlet end, covering less than the entire axial length of the substrate, and a second catalyst coating extending from the inlet end toward the outlet end, covering less than the entire axial length of the substrate and overlapping a portion of the first catalyst coating.

In some embodiments, the catalytic article has a first catalyst coating extending from the outlet end toward the inlet end, covering less than the entire axial length of the substrate, and a second catalyst coating covering the entire axial length of the substrate and overlapping the first catalyst coating.

In some embodiments, the catalytic article has a first catalyst coating covering the entire axial length of the substrate, and a second catalyst coating extending from the inlet end toward the outlet end, covering less than the entire axial length of the substrate and overlapping a portion of the first catalyst coating.

In some embodiments, the catalytic article has a first catalyst coating covering the entire axial length of the substrate, and a second catalyst coating covering the entire axial length of the substrate and overlapping the first catalyst coating.

In some embodiments, the substrate is an extruded SCR. With an extruded SCR substrate, the first and second coating may be located on the outlet end of the substrate.

Ammonia Oxidation Catalyst

Catalyst articles of the present invention may include one or more ammonia oxidation catalysts, also called an ammonia slip catalyst ("ASC"). One or more ASC may be included with or downstream from an SCR catalyst, to oxidize excess ammonia and prevent it from being released to the atmosphere. In some embodiments the ASC may be included on the same substrate as an SCR catalyst, or blended with an SCR catalyst. In certain embodiments, the ammonia oxidation catalyst material may be selected to favor the oxidation of ammonia to nitrogen instead of the formation of $NO_x$ or $N_2O$. Preferred catalyst materials include platinum, palladium, or a combination thereof. The ammonia oxidation catalyst may comprise platinum and/or palladium supported on a metal oxide. The ammonia oxidation catalyst may comprise platinum and/or palladium supported on a molecular sieve such as a zeolite. In some embodiments, the catalyst is disposed on a high surface area support, including but not limited to alumina.

In some embodiments, the ASC composition comprises a platinum group metal distributed on a molecular sieve. The ASC composition may comprise, or consist essentially of, a molecular sieve based ASC formulation.

In general, the molecular sieve based ASC formulation may comprise a molecular sieve having an aluminosilicate framework (e.g. zeolite), an aluminophosphate framework (e.g. AlPO), a silicoaluminophosphate framework (e.g. SAPO), a heteroatom-containing aluminosilicate framework, a heteroatom-containing aluminophosphate framework (e.g. MeAlPO, where Me is a metal), or a heteroatom-containing silicoaluminophosphate framework (e.g. MeAPSO, where Me is a metal). The heteroatom (i.e. in a heteroatom-containing framework) may be selected from the group consisting of boron (B), gallium (Ga), titanium (Ti), zirconium (Zr), zinc (Zn), iron (Fe), vanadium (V) and combinations of any two or more thereof. It is preferred that the heteroatom is a metal (e.g. each of the above heteroatom-containing frameworks may be a metal-containing framework).

It is preferable that the molecular sieve based ASC formulation comprises, or consists essentially of, a molecular sieve having an aluminosilicate framework (e.g. zeolite) or a silicoaluminophosphate framework (e.g. SAPO).

When the molecular sieve has an aluminosilicate framework (e.g. the molecular sieve is a zeolite), then typically the molecular sieve has a silica to alumina molar ratio (SAR) of from 5 to 200 (e.g. 10 to 200), 10 to 100 (e.g. 10 to 30 or 20 to 80), such as 12 to 40, or 15 to 30. In some embodiments, a suitable molecular sieve has a SAR of >200; >600; or >1200. In some embodiments, the molecular sieve has a SAR of from about 1500 to about 2100.

Typically, the molecular sieve is microporous. A microporous molecular sieve has pores with a diameter of less than 2 nm (e.g. in accordance with the IUPAC definition of "microporous" [see *Pure & Appl. Chem.*, 66(8), (1994), 1739-1758)]).

The molecular sieve based ASC formulation may comprise a small pore molecular sieve (e.g. a molecular sieve having a maximum ring size of eight tetrahedral atoms), a medium pore molecular sieve (e.g. a molecular sieve having a maximum ring size of ten tetrahedral atoms) or a large pore molecular sieve (e.g. a molecular sieve having a maximum ring size of twelve tetrahedral atoms) or a combination of two or more thereof.

When the molecular sieve is a small pore molecular sieve, then the small pore molecular sieve may have a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SFW, SIV, THO, TSC, UEI, UFI, VNI, YUG and ZON, or a mixture and/or an intergrowth of two or more thereof. Preferably, the small pore molecular sieve has a framework structure represented by a FTC selected from the group consisting of CHA, LEV, AEI, AFX, ERI, LTA, SFW, KFI, DDR and ITE. More preferably, the small pore molecular sieve has a framework structure represented by a FTC selected from the group consisting of CHA and AEI. The small pore molecular sieve may have a framework structure represented by the FTC CHA. The small pore molecular sieve may have a framework structure represented by the FTC AEI. When the small pore molecular sieve is a zeolite and has a framework represented by the FTC CHA, then the zeolite may be chabazite.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, —PAR, PCR, PON, PUN, RRO, RSN, SFF, SFG, STF, STI, STT, STW, —SVR, SZR, TER, TON, TUN, UOS, VSV, WEI and WEN, or a mixture and/or an intergrowth of two or more thereof. Preferably, the medium pore molecular sieve has a framework structure represented by a FTC selected from the group consisting of FER, MEL, MFI, and STT. More preferably, the medium pore molecular sieve has a framework structure represented by a FTC selected from the group consisting of FER and MFI, particularly MFI. When the medium pore molecular sieve is a zeolite and has a framework represented by the FTC FER or MFI, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, —RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. Preferably, the large pore molecular sieve has a framework structure represented by a FTC selected from the group consisting of AFI, BEA, MAZ, MOR, and OFF. More preferably, the large pore molecular sieve has a framework structure represented by a FTC selected from the group consisting of BEA, MOR and MFI. When the large pore molecular sieve is a zeolite and has a framework represented by the FTC BEA, FAU or MOR, then the zeolite may be a beta zeolite, faujasite, zeolite Y, zeolite X or mordenite.

In general, it is preferred that the molecular sieve is a small pore molecular sieve.

In some embodiments, a platinum group metal is present on the support in an amount of about 0.5 wt % to about 10 wt % of the total weight of the platinum group metal and the support; about 1 wt % to about 6 wt % of the total weight of the platinum group metal and the support; about 1.5 wt % to about 4 wt % of the total weight of the platinum group metal and the support; about 10 wt % of the total weight of the platinum group metal and the support; about 0.5 wt % of the total weight of the platinum group metal and the support; about 1 wt % of the total weight of the platinum group metal and the support; about 2 wt % of the total weight of the platinum group metal and the support; about 3 wt % of the total weight of the platinum group metal and the support; about 4 wt % of the total weight of the platinum group metal and the support; about 5 wt % of the total weight of the platinum group metal and the support; about 6 wt % of the total weight of the platinum group metal and the support; about 7 wt % of the total weight of the platinum group metal and the support; about 8 wt % of the total weight of the platinum group metal and the support; about 9 wt % of the total weight of the platinum group metal and the support; or about 10 wt % of the total weight of the platinum group metal and the support.

In some embodiments, a catalyst article may include an ASC composition in a first catalyst coating and an ASC composition in a second catalyst coating. In some embodiments, the ASC compositions in the first and second catalyst coatings may comprise the same formulation as each other. In some embodiments, the ASC compositions in the first and second catalyst coatings may comprise different formulations than each other.

SCR Catalyst

Systems of the present invention may include one or more SCR catalyst.

In some embodiments, a catalyst article may include an SCR catalyst composition in a first catalyst coating and an SCR catalyst composition in a second catalyst coating. In some embodiments, the SCR catalyst compositions in the first and second catalyst coatings may comprise the same formulation as each other. In some embodiments, the SCR catalyst compositions in the first and second catalyst coatings may comprise different formulations than each other.

The exhaust system of the invention may include an SCR catalyst which is positioned downstream of an injector for introducing ammonia or a compound decomposable to ammonia into the exhaust gas. The SCR catalyst may be positioned directly downstream of the injector for injecting ammonia or a compound decomposable to ammonia (e.g. there is no intervening catalyst between the injector and the SCR catalyst).

In some embodiments, the SCR catalyst includes a substrate and a catalyst composition. The substrate may be a flow-through substrate or a filtering substrate. When the SCR catalyst has a flow-through substrate, then the substrate may comprise the SCR catalyst composition (i.e. the SCR catalyst is obtained by extrusion) or the SCR catalyst composition may be disposed or supported on the substrate (i.e. the SCR catalyst composition is applied onto the substrate by a washcoating method).

When the SCR catalyst has a filtering substrate, then it is a selective catalytic reduction filter catalyst, which is referred to herein by the abbreviation "SCRF". The SCRF comprises a filtering substrate and the selective catalytic reduction (SCR) composition. References to use of SCR catalysts throughout this application are understood to include use of SCRF catalysts as well, where applicable.

The selective catalytic reduction composition may comprise, or consist essentially of, a metal oxide based SCR catalyst formulation, a molecular sieve based SCR catalyst formulation, or mixture thereof. Such SCR catalyst formulations are known in the art.

The selective catalytic reduction composition may comprise, or consist essentially of, a metal oxide based SCR catalyst formulation. The metal oxide based SCR catalyst formulation comprises vanadium or tungsten or a mixture thereof supported on a refractory oxide. The refractory oxide may be selected from the group consisting of alumina, silica, titania, zirconia, ceria and combinations thereof.

The metal oxide based SCR catalyst formulation may comprise, or consist essentially of, an oxide of vanadium (e.g. $V_2O_5$) and/or an oxide of tungsten (e.g. $WO_3$) supported on a refractory oxide selected from the group consisting of titania (e.g. $TiO_2$), ceria (e.g. $CeO_2$), and a mixed or composite oxide of cerium and zirconium (e.g. $Ce_xZr_{(1-x)}O_2$, wherein x=0.1 to 0.9, preferably x=0.2 to 0.5).

When the refractory oxide is titania (e.g. $TiO_2$), then preferably the concentration of the oxide of vanadium is from 0.5 to 6 wt % (e.g. of the metal oxide based SCR formulation) and/or the concentration of the oxide of tungsten (e.g. $WO_3$) is from 5 to 20 wt %. More preferably, the oxide of vanadium (e.g. $V_2O_5$) and the oxide of tungsten (e.g. $WO_3$) are supported on titania (e.g. $TiO_2$).

When the refractory oxide is ceria (e.g. $CeO_2$), then preferably the concentration of the oxide of vanadium is from 0.1 to 9 wt % (e.g. of the metal oxide based SCR formulation) and/or the concentration of the oxide of tungsten (e.g. $WO_3$) is from 0.1 to 9 wt %.

The metal oxide based SCR catalyst formulation may comprise, or consist essentially of, an oxide of vanadium (e.g. $V_2O_5$) and optionally an oxide of tungsten (e.g. $WO_3$), supported on titania (e.g. $TiO_2$).

The selective catalytic reduction composition may comprise, or consist essentially of, a molecular sieve based SCR catalyst formulation. The molecular sieve based SCR catalyst formulation comprises a molecular sieve, which is optionally a transition metal exchanged molecular sieve. It is preferable that the SCR catalyst formulation comprises a transition metal exchanged molecular sieve.

In general, the molecular sieve based SCR catalyst formulation may comprise a molecular sieve having an aluminosilicate framework (e.g. zeolite), an aluminophosphate framework (e.g. AlPO), a silicoaluminophosphate framework (e.g. SAPO), a heteroatom-containing aluminosilicate framework, a heteroatom-containing aluminophosphate framework (e.g. MeAlPO, where Me is a metal), or a heteroatom-containing silicoaluminophosphate framework (e.g. MeAPSO, where Me is a metal). The heteroatom (i.e. in a heteroatom-containing framework) may be selected from the group consisting of boron (B), gallium (Ga), titanium (Ti), zirconium (Zr), zinc (Zn), iron (Fe), vanadium (V) and combinations of any two or more thereof. It is preferred that the heteroatom is a metal (e.g. each of the above heteroatom-containing frameworks may be a metal-containing framework).

It is preferable that the molecular sieve based SCR catalyst formulation comprises, or consist essentially of, a molecular sieve having an aluminosilicate framework (e.g. zeolite) or a silicoaluminophosphate framework (e.g. SAPO).

When the molecular sieve has an aluminosilicate framework (e.g. the molecular sieve is a zeolite), then typically the molecular sieve has a silica to alumina molar ratio (SAR) of from 5 to 200 (e.g. 10 to 200), preferably 10 to 100 (e.g. 10 to 30 or 20 to 80), such as 12 to 40, more preferably 15 to 30.

Typically, the molecular sieve is microporous. A microporous molecular sieve has pores with a diameter of less than 2 nm (e.g. in accordance with the IUPAC definition of "microporous" [see *Pure & Appl. Chem.*, 66(8), (1994), 1739-1758)]).

The molecular sieve based SCR catalyst formulation may comprise a small pore molecular sieve (e.g. a molecular sieve having a maximum ring size of eight tetrahedral atoms), a medium pore molecular sieve (e.g. a molecular sieve having a maximum ring size of ten tetrahedral atoms) or a large pore molecular sieve (e.g. a molecular sieve having a maximum ring size of twelve tetrahedral atoms) or a combination of two or more thereof.

When the molecular sieve is a small pore molecular sieve, then the small pore molecular sieve may have a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SFW, SIV, THO, TSC, UEI, UFI, VNI, YUG and ZON, or a mixture and/or an intergrowth of two or more thereof. Preferably, the small pore molecular sieve has a framework structure represented by a FTC selected from the group consisting of CHA, LEV, AEI, AFX, ERI, LTA, SFW, KFI, DDR and ITE. More preferably, the small pore molecular sieve has a framework structure represented by a FTC selected from the group consisting of CHA and AEI. The small pore molecular sieve may have a framework structure represented by the FTC CHA. The small pore molecular sieve may have a framework structure represented by the FTC AEI. When the small pore molecular sieve is a zeolite and has a framework represented by the FTC CHA, then the zeolite may be chabazite.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, —PAR, PCR, PON, PUN, RRO, RSN, SFF, SFG, STF, STI, STT, STW, —SVR, SZR, TER, TON, TUN, UOS, VSV, WEI and WEN, or a mixture and/or an intergrowth of two or more thereof. Preferably, the medium pore molecular sieve has a framework structure represented by a FTC selected from the group consisting of FER, MEL, MFI, and STT. More preferably, the medium pore molecular sieve has a framework structure represented by a FTC selected from the group consisting of FER and MFI, particularly MFI. When the medium pore molecular sieve is a zeolite and has a framework represented by the FTC FER or MFI, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, —RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. Preferably, the large pore molecular sieve has a framework structure represented by a FTC selected from the group consisting of AFI, BEA, MAZ, MOR, and OFF. More preferably, the large pore molecular sieve has a framework structure represented by a FTC selected from the group consisting of BEA, MOR and MFI. When the large pore molecular sieve is a zeolite and has a framework represented by the FTC BEA, FAU or MOR, then the zeolite may be a beta zeolite, faujasite, zeolite Y, zeolite X or mordenite.

In general, it is preferred that the molecular sieve is a small pore molecular sieve.

The molecular sieve based SCR catalyst formulation preferably comprises a transition metal exchanged molecular sieve. The transition metal may be selected from the group consisting of cobalt, copper, iron, manganese, nickel, palladium, platinum, ruthenium and rhenium.

The transition metal may be copper. An advantage of SCR catalyst formulations containing a copper exchanged molecular sieve is that such formulations have excellent low temperature $NO_x$ reduction activity (e.g. it may be superior to the low temperature $NO_x$ reduction activity of an iron exchanged molecular sieve). Systems and method of the present invention may include any type of SCR catalyst, however, SCR catalysts including copper ("Cu—SCR catalysts") may experience more notable benefits from systems of the present invention, as they are particularly vulnerable to the effects of sulfation. Cu—SCR catalyst formulations may include, for example, Cu exchanged SAPO-34, Cu exchanged CHA zeolite, Cu exchanged AEI zeolites, or combinations thereof.

The transition metal may be present on an extra-framework site on the external surface of the molecular sieve or within a channel, cavity or cage of the molecular sieve.

Typically, the transition metal exchanged molecular sieve comprises an amount of 0.10 to 10% by weight of the transition metal exchanged molecular, preferably an amount of 0.2 to 5% by weight.

In general, the selective catalytic reduction catalyst comprises the selective catalytic reduction composition in a total concentration of 0.5 to 4.0 g in$^{-3}$, preferably 1.0 to 3.0 g in$^{-3}$.

The SCR catalyst composition may comprise a mixture of a metal oxide based SCR catalyst formulation and a molecular sieve based SCR catalyst formulation. The (a) metal oxide based SCR catalyst formulation may comprise, or consist essentially of, an oxide of vanadium (e.g. $V_2O_5$) and optionally an oxide of tungsten (e.g. $WO_3$), supported on titania (e.g. $TiO_2$) and (b) the molecular sieve based SCR catalyst formulation may comprise a transition metal exchanged molecular sieve.

When the SCR catalyst is an SCRF, then the filtering substrate may preferably be a wall flow filter substrate monolith. The wall flow filter substrate monolith (e.g. of the SCR-DPF) typically has a cell density of 60 to 400 cells per square inch (cpsi). It is preferred that the wall flow filter substrate monolith has a cell density of 100 to 350 cpsi, more preferably 200 to 300 cpsi.

The wall flow filter substrate monolith may have a wall thickness (e.g. average internal wall thickness) of 0.20 to 0.50 mm, preferably 0.25 to 0.35 mm (e.g. about 0.30 mm).

Generally, the uncoated wall flow filter substrate monolith has a porosity of from 50 to 80%, preferably 55 to 75%, and more preferably 60 to 70%.

The uncoated wall flow filter substrate monolith typically has a mean pore size of at least 5 µm. It is preferred that the mean pore size is from 10 to 40 µm, such as 15 to 35 µm, more preferably 20 to 30 µm.

The wall flow filter substrate may have a symmetric cell design or an asymmetric cell design.

In general for an SCRF, the selective catalytic reduction composition is disposed within the wall of the wall-flow filter substrate monolith. Additionally, the selective catalytic reduction composition may be disposed on the walls of the inlet channels and/or on the walls of the outlet channels.

First and Second Catalyst Coatings and Configurations

Embodiments of the present invention may include a combination of 1) a platinum group metal distributed on a molecular sieve; and 2) a base metal distributed on a molecular sieve. In some embodiments, the combination may comprise a blend or mixture. In some embodiments, the platinum group metal distributed on a molecular sieve may provide an oxidative functionality, such as ASC functionality, and may be formulated as described in the Ammonia Oxidation Catalyst section, above. In some embodiments, the base metal distributed on a molecular sieve may provide an SCR catalyst functionality, and may be formulated as described in the SCR Catalyst section, above.

In some embodiments, the first catalyst coating and the second catalyst coating overlap to form three zones: a first zone to primarily remove NOx, a second zone to primarily oxidize ammonia to $N_2$, and a third zone to primarily oxidize carbon monoxide and hydrocarbons.

In some embodiments, the platinum group metal in the first and/or second coating comprises platinum, palladium, or a combination thereof. In some embodiments, the molecular sieve in the first and/or second coating may comprise a zeolite. In some embodiments, the base metal in the first and/or second coating comprises copper, iron, or a combination thereof. In some embodiments, the first coating and second coating each comprise platinum distributed on a zeolite and copper distributed on a zeolite.

In some embodiments, the first coating includes a higher platinum group metal loading than the second coating. In some embodiments, the first coating and the second coating include an equivalent platinum group metal loading. The first coating may include a platinum group metal loading of about 0 g/ft$^3$ to about 10 g/ft$^3$; about 0.5 g/ft$^3$ to about 10 g/ft$^3$; about 1 g/ft$^3$ to about 10 g/ft$^3$; about 1 g/ft$^3$ to about 9 g/ft$^3$; about 1 g/ft$^3$ to about 8 g/ft$^3$; about 1 g/ft$^3$ to about 7 g/ft$^3$; about 1 g/ft$^3$ to about 6 g/ft$^3$; about 1 g/ft$^3$ to about 5 g/ft$^3$; about 2 g/ft$^3$ to about 4 g/ft$^3$; about 0.5 g/ft$^3$; about 1 g/ft$^3$; about 2 g/ft$^3$; about 3 g/ft$^3$; about 4 g/ft$^3$; about 5 g/ft$^3$; about 6 g/ft$^3$; about 7 g/ft$^3$; about 8 g/ft$^3$; about 9 g/ft$^3$; or about 10 g/ft$^3$. The second coating comprises a platinum group metal loading of about 0 g/ft$^3$ to about 5 g/ft$^3$; about 0.5 g/ft$^3$ to about 5 g/ft$^3$; about 1 g/ft$^3$ to about 5 g/ft$^3$; about 1 g/ft$^3$ to about 4 g/ft$^3$; about 1 g/ft$^3$ to about 3 g/ft$^3$; about 0.5 g/ft$^3$; about 1 g/ft$^3$; about 2 g/ft$^3$; about 3 g/ft$^3$; about 4 g/ft$^3$; or about 5 g/ft$^3$.

The weight ratio of platinum group metal in the first coating to the platinum group metal in the second coating is from about 20:1 to about 1:3; about 20:1 to about 1:1; about 10:1 to about 1:2; about 10:1 to about 1:1; about 6:1 to about 1:1; about 3:1 to about 1:1; about 3:0.5 to about 1:1; about 20:1; about 15:1; about 10:1; about 8:1; about 6:1; about 5:1; about 4:1; about 3:1; about 2:1; about 3:0.5; about 1:0.5; about 1:1; about 1:2; or about 1:3.

With reference to FIG. 1, prior art catalysts are known to have a first catalyst coating including an SCR catalyst component such as a base metal on a molecular sieve and an ASC component such as a platinum group metal on a molecular sieve, and a second catalyst coating including an SCR catalyst component such as a base metal on a molecular sieve. As shown in FIG. 1a, the first coating may extend from the outlet end toward the inlet end, covering less than the entire axial length of the substrate, and the second catalyst coating may extend from the inlet end toward the outlet end, covering less than the entire axial length of the substrate and overlapping a portion of the first catalyst coating. As shown in FIG. 1b, the first catalyst coating may cover the entire axial length of the substrate, and the second catalyst coating may cover the entire axial length of the substrate and overlap the first catalyst coating.

With reference to FIG. 2, catalytic articles of embodiments of the present invention may include a first catalyst coating having an SCR catalyst component such as a base metal on a molecular sieve and an ASC component such as a platinum group metal on a molecular sieve, and a second catalyst coating including an SCR catalyst component such as a base metal on a molecular sieve and an ASC component such as a platinum group metal on a molecular sieve, where the platinum group metal loading in the second catalyst coating is less than the platinum group metal loading in the first catalyst coating. The catalytic article may be configured such that the first catalyst coating extends from the outlet end toward the inlet end, covering less than the entire axial length of the substrate, and the second catalyst coating extends from the inlet end toward the outlet end, covering less than the entire axial length of the substrate and overlapping a portion of the first catalyst coating.

Figure 3:
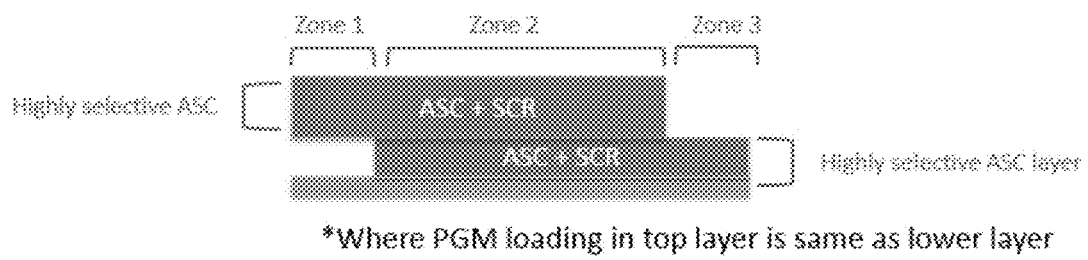
FIG. 3 depicts catalyst configurations having an ASC and SCR catalyst in the bottom layer and an ASC and SCR catalyst in the top layer, where the bottom layer extends from the outlet end toward the inlet end, covering less than the entire length of the substrate and the top layer extends from the inlet end toward the outlet end, covering less than the entire length of the substrate.

With reference to FIG. 3, catalytic articles of embodiments of the present invention may include a first catalyst coating having an SCR catalyst component such as a base metal on a molecular sieve and an ASC component such as a platinum group metal on a molecular sieve, and a second catalyst coating including an SCR catalyst component such as a base metal on a molecular sieve and an ASC component such as a platinum group metal on a molecular sieve, where the platinum group metal loading in the second catalyst coating is the same as the platinum group metal loading in the first catalyst coating. The catalytic article may be configured such that the first catalyst coating extends from the outlet end toward the inlet end, covering less than the entire axial length of the substrate, and the second catalyst coating extends from the inlet end toward the outlet end, covering less than the entire axial length of the substrate and overlapping a portion of the first catalyst coating.

With reference to FIG. 4, catalytic articles of embodiments of the present invention may include a first catalyst coating having an SCR catalyst component such as a base metal on a molecular sieve and an ASC component such as a platinum group metal on a molecular sieve, the first catalyst coating extending the entire length of the substrate, and a second catalyst coating having an SCR catalyst component such as a base metal on a molecular sieve and an ASC component such as a platinum group metal on a molecular sieve, the second catalyst coating covering the first catalyst coating, also extending the entire length of the substrate. As shown in FIG. 4a, the platinum group metal loading in the second catalyst coating may be lower than the platinum group metal loading in the first catalyst coating. As shown in FIG. 4b, the platinum group metal loading in the second catalyst coating may be the same as the platinum group metal loading in the first catalyst coating.

With reference to FIG. 5, catalytic articles of embodiments of the present invention may include a first catalyst coating having an SCR catalyst component such as a base metal on a molecular sieve and an ASC component such as a platinum group metal on a molecular sieve, the first catalyst coating extending the entire length of the substrate, and a second catalyst coating having an SCR catalyst component such as a base metal on a molecular sieve and an ASC component such as a platinum group metal on a molecular sieve, the second catalyst coating extending from the inlet end toward the outlet end, covering less than the entire length of the substrate and overlapping a portion of the first catalyst coating. As shown in FIG. 5a, the platinum group metal loading in the second catalyst coating may be lower than the platinum group metal loading in the first catalyst coating. As shown in FIG. 5b, the platinum group metal loading in the second catalyst coating may be the same as the platinum group metal loading in the first catalyst coating.

With reference to FIG. 6, catalytic articles of embodiments of the present invention may include a first catalyst coating having an SCR catalyst component such as a base metal on a molecular sieve and an ASC component such as a platinum group metal on a molecular sieve, the first catalyst coating extending from the outlet end toward the inlet end, covering less than the entire length of the substrate, and a second catalyst coating having an SCR catalyst component such as a base metal on a molecular sieve and an ASC component such as a platinum group metal on a molecular sieve, the second catalyst coating covering the entire length of the substrate, overlapping the first catalyst coating. As shown in FIG. 6a, the platinum group metal loading in the second catalyst coating may be lower than the platinum group metal loading in the first catalyst coating. As shown in FIG. 6b, the platinum group metal loading in the second catalyst coating may be the same as the platinum group metal loading in the first catalyst coating.

With reference to FIG. 7, catalytic articles of embodiments of the present invention may be located downstream of an SCR catalyst. In some embodiments, the SCR catalyst and the catalytic article are located on the same substrate. In some embodiments, the SCR catalyst and the catalytic article are on separate, close-coupled substrates. As shown in FIG. 7a, the first catalyst coating, having an SCR catalyst component such as a base metal on a molecular sieve and an ASC component such as a platinum group metal on a molecular sieve, may extend from the outlet end toward the inlet end and the second catalyst, coating having an SCR catalyst component such as a base metal on a molecular sieve and an ASC component such as a platinum group metal on a molecular sieve, may extend from the outlet end toward the inlet end, with the second catalyst coating covering all or a portion of the first catalyst coating. The platinum group metal loading in the second catalyst coating may be lower than the platinum group metal loading in the first catalyst coating. As shown in FIG. 7b, the platinum group metal loading in the second catalyst coating may be the same as the platinum group metal loading in the first catalyst coating.

With reference to FIG. 8, catalytic articles of embodiments of the present invention may be coated on an extruded SCR catalyst. The first catalyst coating, having an SCR catalyst component such as a base metal on a molecular sieve and an ASC component such as a platinum group metal on a molecular sieve, may extend from the outlet end toward the inlet end, covering less than the entire axial length of the substrate, and the second catalyst coating, having an SCR catalyst component such as a base metal on a molecular sieve and an ASC component such as a platinum group metal on a molecular sieve, may extend from the outlet end toward the inlet end, covering less than the entire axial length of the substrate, with the second catalyst coating covering all or a portion of the first catalyst coating. As shown in FIG. 8a, the platinum group metal loading in the second catalyst coating may be lower than the platinum group metal loading in the first catalyst coating. As shown in FIG. 8b, the platinum group metal loading in the second catalyst coating may be the same as the platinum group metal loading in the first catalyst coating.

DOC

Catalyst articles and systems of the present invention may include one or more diesel oxidation catalysts. Oxidation catalysts, and in particular diesel oxidation catalysts (DOCs), are well-known in the art. Oxidation catalysts are designed to oxidize CO to $CO_2$ and gas phase hydrocarbons (HC) and an organic fraction of diesel particulates (soluble organic fraction) to $CO_2$ and $H_2O$. Typical oxidation catalysts include platinum and optionally also palladium on a high surface area inorganic oxide support, such as alumina, silica-alumina and a zeolite.

Substrate

Catalysts of the present invention may each further comprise a flow-through substrate or filter substrate. In one embodiment, the catalyst may be coated onto the flow-through or filter substrate, and preferably deposited on the flow-through or filter substrate using a washcoat procedure.

The combination of an SCR catalyst and a filter is known as a selective catalytic reduction filter (SCRF catalyst). An SCRF catalyst is a single-substrate device that combines the functionality of an SCR and particulate filter, and is suitable for embodiments of the present invention as desired. Description of and references to the SCR catalyst throughout this application are understood to include the SCRF catalyst as well, where applicable.

The flow-through or filter substrate is a substrate that is capable of containing catalyst/adsorber components. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval. The flow-through substrate may also be high porosity which allows the catalyst to penetrate into the substrate walls.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The catalyst/adsorber may be added to the flow-through or filter substrate by any known means, such as a washcoat procedure.

Reductant/Urea Injector

The system may include a means for introducing a nitrogenous reductant into the exhaust system upstream of an SCR and/or SCRF catalyst. It may be preferred that the means for introducing a nitrogenous reductant into the exhaust system is directly upstream of the SCR or SCRF catalyst (e.g. there is no intervening catalyst between the means for introducing a nitrogenous reductant and the SCR or SCRF catalyst).

The reductant is added to the flowing exhaust gas by any suitable means for introducing the reductant into the exhaust gas. Suitable means include an injector, sprayer, or feeder. Such means are well known in the art.

The nitrogenous reductant for use in the system can be ammonia per se, hydrazine, or an ammonia precursor selected from the group consisting of urea, ammonium carbonate, ammonium carbamate, ammonium hydrogen carbonate, and ammonium formate. Urea is particularly preferred.

The exhaust system may also comprise a means for controlling the introduction of reductant into the exhaust gas in order to reduce NOx therein. Preferred control means may include an electronic control unit, optionally an engine control unit, and may additionally comprise a NOx sensor located downstream of the NO reduction catalyst.

Systems and Methods

Emissions treatment systems of the present invention may include a diesel engine emitting an exhaust stream including particulate matter, NOx, and carbon monoxide, and a catalytic article as described herein. A system may include an SCR catalyst upstream of the catalytic article. In some embodiments, the SCR catalyst is close-coupled with the catalytic article. In some embodiments, the SCR catalyst and the catalytic article are located on a single substrate, and the SCR catalyst is located on an inlet side of the substrate and the catalytic article is located on the outlet side of the substrate.

Methods of the present invention may include contacting the exhaust stream with a catalytic article as described herein.

Benefits

Catalyst articles of the present invention may provide desirable catalytic activity and selectivity. Traditionally, catalyst articles have included SCR functionality in the top or front layer, and ASC functionality in a bottom or rear layer. It has surprisingly been found that including a platinum group metal on a molecular sieve in both a top and bottom layer provides various benefits and advantages to $NH_3$ conversion, as well as zoned ASC configurations with desirable selectivity and catalyst activity.

For example, the presence of a platinum group metal in the second coating may provide a boost in $NH_3$ conversion; such boost may be due to improved diffusion, such as based on accessibility to the top layer. Additionally, inclusion of a platinum group metal in the second coating may lead to a zoned ASC configuration combining highly selective regions (zone 1) and highly active regions (zones 2 and 3). For example, in some embodiments and as shown in FIGS. 2 and 3, the first catalyst coating and the second catalyst coating overlap to form three zones: a first zone to primarily remove NOx, a second zone to primarily oxidize ammonia to $N_2$, and a third zone to primarily oxidize carbon monoxide and hydrocarbons.

Further, the presence of a platinum group metal in the second coating offers the configuration where both the first coating and the second coating contain equivalent amounts of platinum group metal. Such configuration may provide a simplified product prepared with one washcoat, and which may be able to be used either way around.

As used in this specification and the appended claims, the singular forms "a", "an" and "the" include plural referents unless the context clearly indicates otherwise. Thus, for example, reference to "a catalyst" includes a mixture of two or more catalysts, and the like.

The term "ammonia slip", means the amount of unreacted ammonia that passes through the SCR catalyst.

The term "support" means the material to which a catalyst is fixed.

The term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

When a range, or ranges, for various numerical elements are provided, the range, or ranges, can include the values, unless otherwise specified.

The term "$N_2$ selectivity" means the percent conversion of ammonia into nitrogen.

The terms "diesel oxidation catalyst" (DOC), "diesel exotherm catalyst" (DEC), "NOx absorber", "SCR/PNA" (selective catalytic reduction/passive NOx adsorber), "cold-start catalyst" (CSC) and "three-way catalyst" (TWC) are well known terms in the art used to describe various types of catalysts used to treat exhaust gases from combustion processes.

The term "platinum group metal" or "PGM" refers to platinum, palladium, ruthenium, rhodium, osmium and iridium. The platinum group metals are preferably platinum, palladium, ruthenium or rhodium.

The terms "downstream" and "upstream" describe the orientation of a catalyst or substrate where the flow of exhaust gas is from the inlet end to the outlet end of the substrate or article.

EXAMPLE

Catalysts were prepared having formulations as described below, including a reference formulation as well as a formulation of embodiments of the present invention.

Reference Catalyst:

A bi-layer formulation having a Pt on alumina bottom layer and a SCR top layer was used as a reference example.

A bottom layer was applied to a ceramic substrate using a washcoat comprising 0.17 wt % Pt on a blend of alumina and bare zeolite. The washcoat was applied to a ceramic substrate, then the washcoat was pulled down the substrate using a vacuum. The article was dried and calcined at about 500° C. for about 1 hour. The loading of Pt on the article was 3 g/ft$^3$.

A top layer was applied to the substrate coated with the bottom layer using a second washcoat comprising a Cu—CHA, then the washcoat was pulled down the substrate using a vacuum. The article was dried and calcined at about 500° C. for about 1 hour. The loading of Cu—CHA in the top layer was 2.0 g/in$^3$.

Pt-Zeolite Blend Catalyst:

A bottom layer was applied to a ceramic substrate using a washcoat comprising a blend of 3 wt % Pt on a ZSM-5 (MFI framework with SAR=2000) and a Cu-AEI. The washcoat was applied to a ceramic substrate, then the washcoat was pulled down the substrate using a vacuum. The article was dried and calcined at about 500° C. for about 1 hour. The loading of Pt and the Cu-AEI on the article varied from 0-3 g/ft$^3$ and 0.9 g/in$^3$, respectively.

A top layer was applied to a ceramic substrate using a washcoat comprising a blend of 3 wt % Pt on a ZSM-5 (MFI framework with SAR=2000) and a Cu-AEI. The washcoat was applied to a ceramic substrate, then the washcoat was pulled down the substrate using a vacuum. The article was dried and calcined at about 500° C. for about 1 hour. The loading of Pt and the Cu-AEI on the article varied from 0-3 g/ft$^3$ and 0.9 g/in$^3$, respectively.

The prepared catalysts were then subjected to the following conditions:

Aging condition: 580° C. under 10% $H_2O$ in air for 100 hours

Testing condition: 500 ppm $NH_3$, 10% $O_2$, 4.5% $H_2O$, 4.5% $CO_2$, balance $N_2$; SV=150,000 h$^{-1}$ Nomenclature used: Bottom layer Pt loading x g/ft$^3$/Top layer Pt loading y g/ft$^3$=x/y

Figure 9:
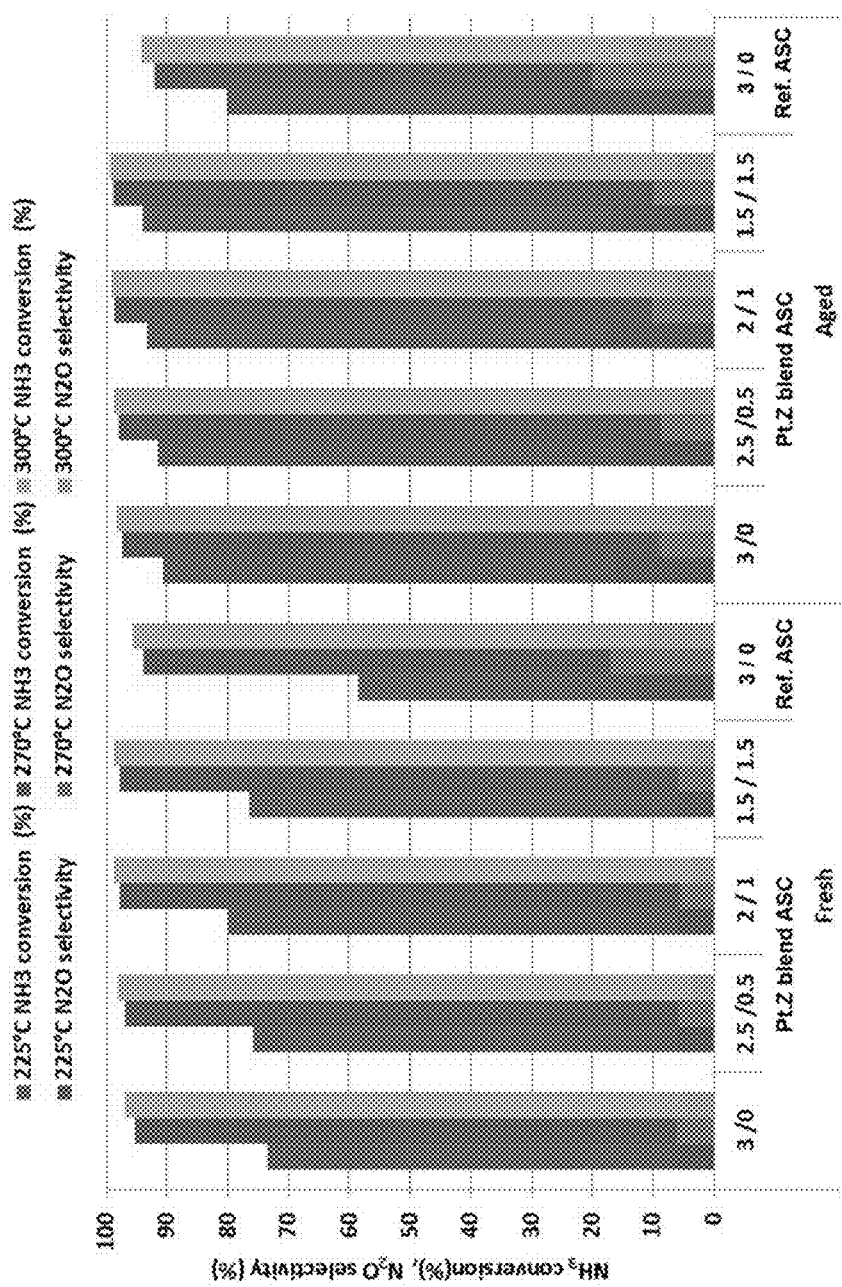
FIG. 9 shows $NH_3$ conversion for reference catalysts and catalysts of embodiments of the present invention.
Figure 10:
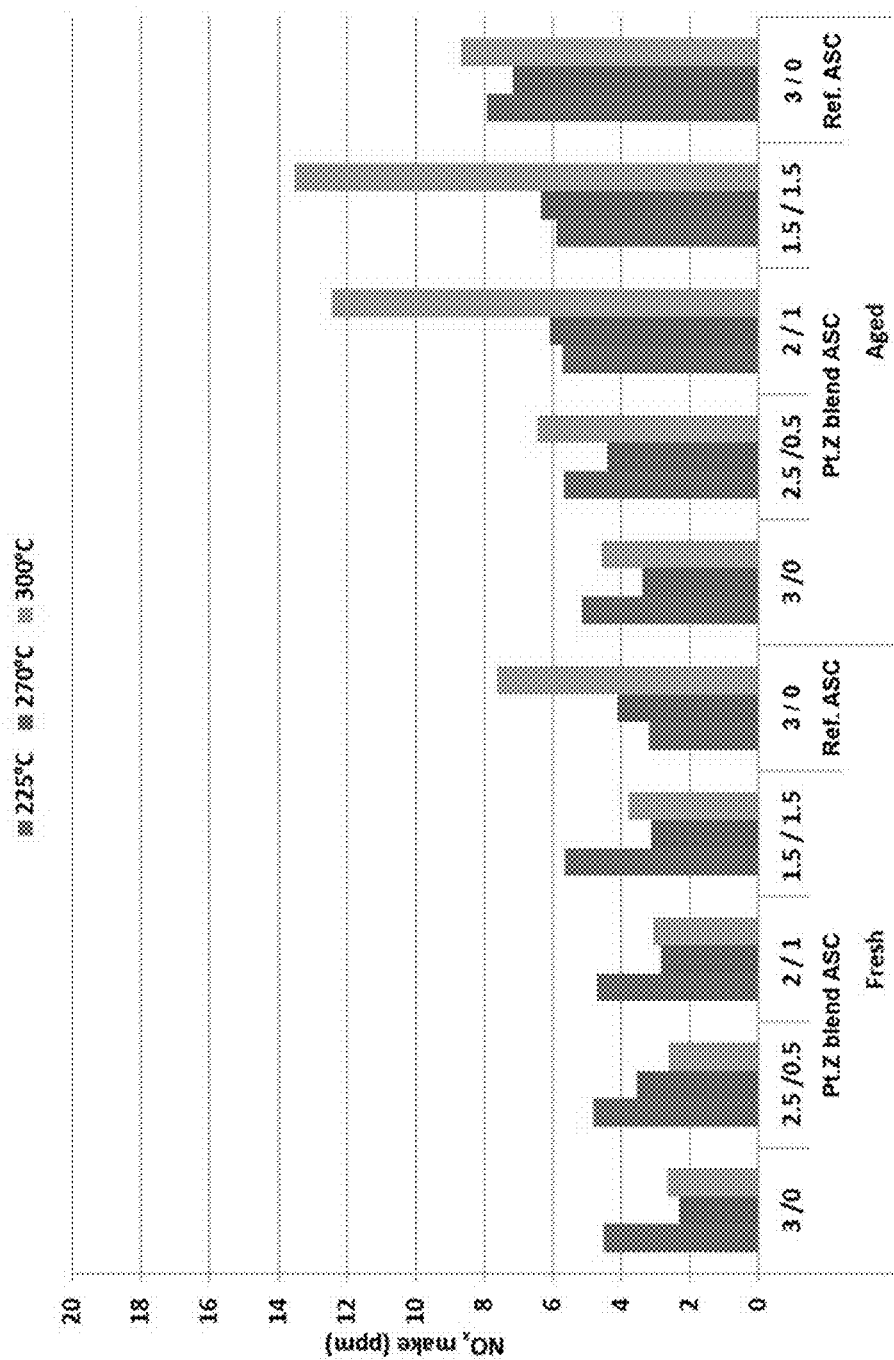
FIG. 10 shows NOx re-make for reference catalysts and catalysts of embodiments of the present invention.

RESULTS AND CONCLUSIONS $NH_3$ conversion, $N_2O$ selectivity, and NOx re-make comparing the reference catalyst to Pt-zeolite blend catalysts having various Pt distributions in the bottom and top layer are shown in FIGS. 9 and 10. Clear advantages are seen on all the Pt-zeolite blend catalysts compared to the reference catalyst. By varying the Pt loading distributions on the Pt-zeolite blend catalyst, $NH_3$ conversion and $N_2$ selectivity can be tuned. For example, from Pt (3/0) to Pt (2.5/0.5), $NH_3$ conversion is improved without notable changes in selectivity. When the Pt distribution is changed to (2/1) and (1.5/1.5), further improvement on $NH_3$ conversion is seen with minimal impact on $N_2O$ selectivity; however, NOx re-make is increased substantially comparing to the reference catalyst and Pt-zeolite blend catalyst at Pt (3/0)—this might be ideal for applications with a oxidation catalyst and a second SCR/ASC downstream, where $NH_3$ conversion and $N_2O$ selectivity is much more important than NOx selectivity. The flexibility of including Pt in the top layer and varying Pt distributions between the two layers offers another design parameter—not attainable in traditional two layered ammonia slip catalysts—to tune $NH_3$ conversion and selectivity to achieve the best system performance on the basis of individual system targets and requirements.

The invention claimed is:

1. A catalytic article for treating an exhaust gas stream containing particulate matter, hydrocarbons, CO, and ammonia, the article comprising:
   a. a substrate having an inlet end and an outlet end defining an axial length;
   b. a first catalyst coating including: 1) a platinum group metal distributed on a molecular sieve, and 2) a base metal distributed on a molecular sieve;
   c. a second catalyst coating including: 1) a platinum group metal distributed on a molecular sieve, and 2) a base metal distributed on a molecular sieve,
   wherein
   a. the first catalyst coating extends from the outlet end toward the inlet end, covering less than the entire axial length of the substrate; and
   b. the second catalyst coating extends from the inlet end toward the outlet end, covering less than the entire axial length of the substrate and overlapping a portion of the first catalyst coating.

2. The catalytic article of claim 1, wherein the molecular sieve in the first and/or second coating comprises a zeolite.

3. The catalytic article of claim 1, wherein the base metal in the first and/or second coating comprises copper, iron, or a combination thereof.

4. The catalytic article of claim 1, wherein the first coating and second coating each comprise platinum distributed on a zeolite and copper distributed on a zeolite.

5. The catalytic article of claim 1, wherein the first coating includes a higher platinum group metal loading than the second coating.

6. The catalytic article of claim 1, wherein the first coating and the second coating include an equivalent platinum group metal loading.

7. The catalytic article of claim 1, wherein first coating comprises a platinum group metal loading of about 0 $g/ft^3$ to about 10 $g/ft^3$, or about 1 $g/ft^3$ to about 5 $g/ft^3$.

8. The catalytic article of claim 1, wherein the second coating comprises a platinum group metal of about 0 $g/ft^3$ to about 5 $g/ft^3$; or about 1 $g/ft^3$ to about 3 $g/ft^3$.

9. The catalytic article of claim 1, wherein the weight ratio of platinum group metal in the first coating to the platinum group metal in the second coating is from about 20:1 to about 1:3; about 20:1 to about 1:1; about 10:1 to about 1:2; about 10:1 to about 1:1; about 6:1 to about 1:1; about 3:1 to about 1:1; or about 3:0.5 to about 1:1.

10. The catalyst article of claim 1, wherein the first catalyst coating and the second catalyst coating overlap to form three zones, a first zone to primarily remove NOx, a second zone to primarily oxidize ammonia to $N_2$, and a third zone to primarily oxidize carbon monoxide and hydrocarbons.

11. The catalyst article of claim 1, wherein the substrate comprises an extruded SCR.

12. The catalyst article of claim 1, wherein the substrate comprises an extruded SCR.

13. The catalyst article of claim 1, wherein the substrate comprises an extruded SCR.

14. An emissions treatment system comprising:
   a. a diesel engine emitting an exhaust stream including particulate matter, NOx, and carbon monoxide;
   b. an SCR catalyst;
   c. a catalytic article comprising:
      i. a substrate having an inlet end and an outlet end defining an axial length;
      ii. a first catalyst coating including: 1) a platinum group metal distributed on a molecular sieve, and 2) a base metal distributed on a molecular sieve;
      iii. a second catalyst coating including: 1) a platinum group metal distributed on a molecular sieve, and 2) a base metal distributed on a molecular sieve; the catalytic article located downstream of the SCR catalyst,
   wherein the SCR catalyst and the ASC catalyst are located on a single substrate, and the SCR catalyst is located on an inlet side of the substrate and the ASC catalyst is located on the outlet side of the substrate.

15. A method of reducing emissions from an exhaust stream, comprising contacting the exhaust stream with the catalyst article of claim 1.

16. A catalytic article for treating an exhaust gas stream containing particulate matter, hydrocarbons, CO, and ammonia, the article comprising:
   a. a substrate having an inlet end and an outlet end defining an axial length;
   b. a first catalyst coating including: 1) a platinum group metal distributed on a molecular sieve, and 2) a base metal distributed on a molecular sieve;
   c. a second catalyst coating including: 1) a platinum group metal distributed on a molecular sieve, and 2) a base metal distributed on a molecular sieve,
   wherein
   a. the first catalyst coating extends from the outlet end toward the inlet end, covering less than the entire axial length of the substrate; and
   b. the second catalyst coating covers the entire axial length of the substrate and overlaps the first catalyst coating.

17. The catalytic article of claim 16, wherein the molecular sieve in the first and/or second coating comprises a zeolite.

18. The catalytic article of claim 16, wherein the base metal in the first and/or second coating comprises copper, iron, or a combination thereof.

19. The catalytic article of claim 16, wherein the first coating and second coating each comprise platinum distributed on a zeolite and copper distributed on a zeolite.

20. The catalytic article of claim 16, wherein the first coating includes a higher platinum group metal loading than the second coating.

21. The catalytic article of claim 16, wherein the first coating and the second coating include an equivalent platinum group metal loading.

22. The catalytic article of claim 16, wherein first coating comprises a platinum group metal loading of about 0 $g/ft^3$ to about 10 $g/ft^3$, or about 1 $g/ft^3$ to about 5 $g/ft^3$.

23. The catalytic article of claim 16, wherein the second coating comprises a platinum group metal of about 0 $g/ft^3$ to about 5 $g/ft^3$; or about 1 $g/ft^3$ to about 3 $g/ft^3$.

24. The catalytic article of claim 16, wherein the weight ratio of platinum group metal in the first coating to the platinum group metal in the second coating is from about 20:1 to about 1:3; about 20:1 to about 1:1; about 10:1 to about 1:2; about 10:1 to about 1:1; about 6:1 to about 1:1; about 3:1 to about 1:1; or about 3:0.5 to about 1:1.

25. A catalytic article for treating an exhaust gas stream containing particulate matter, hydrocarbons, CO, and ammonia, the article comprising:
 a. a substrate having an inlet end and an outlet end defining an axial length;
 b. a first catalyst coating including: 1) a platinum group metal distributed on a molecular sieve, and 2) a base metal distributed on a molecular sieve;
 c. a second catalyst coating including: 1) a platinum group metal distributed on a molecular sieve, and 2) a base metal distributed on a molecular sieve,
 wherein
 a. the first catalyst coating covers the entire axial length of the substrate; and
 b. the second catalyst coating extends from the inlet end toward the outlet end, covering less than the entire axial length of the substrate and overlapping a portion of the first catalyst coating.

26. The catalytic article of claim 25, wherein the molecular sieve in the first and/or second coating comprises a zeolite.

27. The catalytic article of claim 25, wherein the base metal in the first and/or second coating comprises copper, iron, or a combination thereof.

28. The catalytic article of claim 25, wherein the first coating and second coating each comprise platinum distributed on a zeolite and copper distributed on a zeolite.

29. The catalytic article of claim 25, wherein the first coating includes a higher platinum group metal loading than the second coating.

30. The catalytic article of claim 25, wherein the first coating and the second coating include an equivalent platinum group metal loading.

31. The catalytic article of claim 25, wherein first coating comprises a platinum group metal loading of about 0 $g/ft^3$ to about 10 $g/ft^3$, or about 1 $g/ft^3$ to about 5 $g/ft^3$.

32. The catalytic article of claim 25, wherein the second coating comprises a platinum group metal of about 0 $g/ft^3$ to about 5 $g/ft^3$, or about 1 $g/ft^3$ to about 3 $g/ft^3$.

33. The catalytic article of claim 25, wherein the weight ratio of platinum group metal in the first coating to the platinum group metal in the second coating is from about 20:1 to about 1:3; about 20:1 to about 1:1; about 10:1 to about 1:2; about 10:1 to about 1:1; about 6:1 to about 1:1; about 3:1 to about 1:1; or about 3:0.5 to about 1:1.

\* \* \* \* \*